May 17, 1927.
P. A. STOVER
REAR SIGNAL LIGHT FOR AUTOMOBILES
Filed April 4, 1923
1,629,231
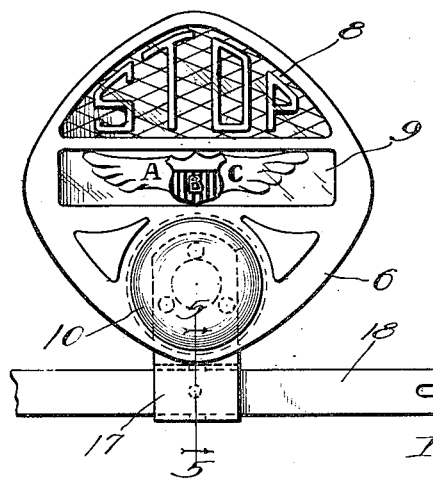
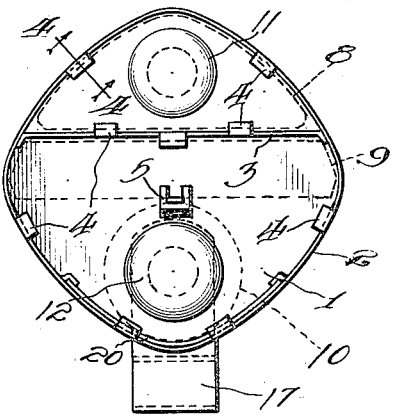
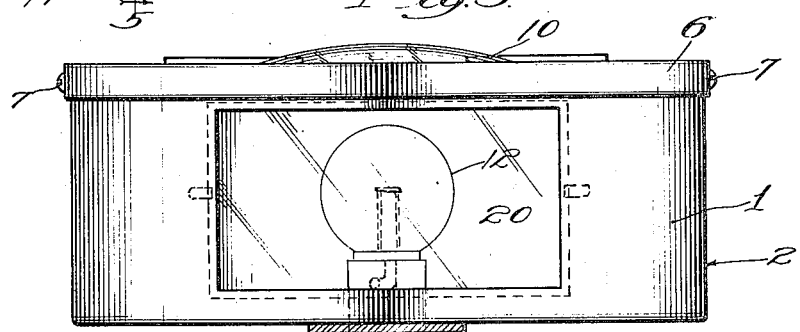
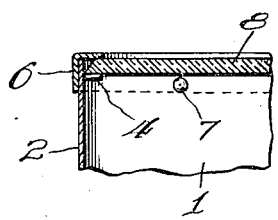
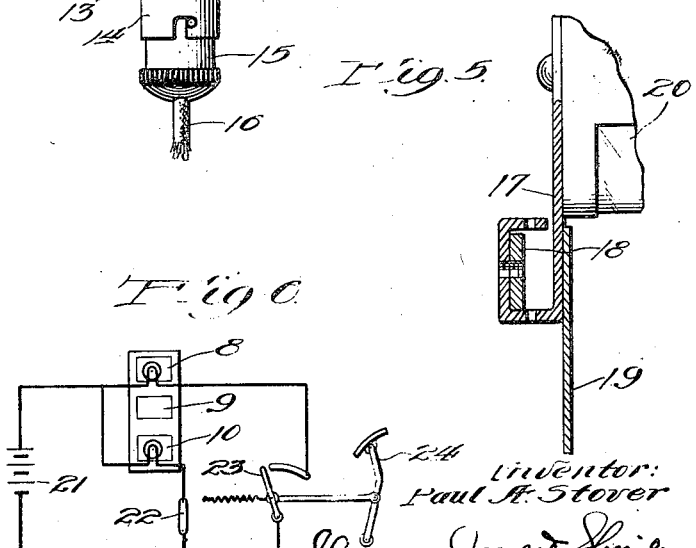
Inventor:
Paul A. Stover
by Sheridan Jones & Sheridan
Attys Patented May 17, 1927.

1,629,231

UNITED STATES PATENT OFFICE.

PAUL A. STOVER, OF RACINE, WISCONSIN, ASSIGNOR TO THE STOVER SIGNAL ENGINEERING COMPANY, OF RACINE, WISCONSIN, A CORPORATION OF DELAWARE.

REAR SIGNAL LIGHT FOR AUTOMOBILES.

Application filed April 4, 1923. Serial No. 629,765.

My invention relates to improvements in rear signal lights for automobiles. More specifically, it relates to an improved combination tail lamp and danger signal, i. e., a lamp structure having a red light or other distinctively colored light constantly visible from the rear of the vehicle, and a second lamp which is illuminated intermittently to indicate a change of speed, such as a slowing down or stopping of the machine.

One of the objects of the invention is to provide a simple, compact, and ornamental lamp structure of this character. Another object is to provide a lamp structure having three translucent panels, one of which may be illuminated for a long interval of time, serving as a tail light, another of which may be illuminated when the car slows down or stops, thus constituting a warning signal, and the third of which has an ornamental design or other insignia thereon, such as the name or trade-mark of the automobile manufacturer, the name of a city, the initial or monogram of the owner, or the designating symbol of some club or other organization, together with means for illuminating said third panel. An additional object is to provide such a combination lamp with an additional side or bottom transparent panel for illuminating the license plate. A further object is to combine such a lamp structure with the license plate support, thus providing a complete unitary structure which may be conveniently mounted on or near the rear of the car as a single installation.

In the accompanying drawings, I have illustrated one embodiment of the invention.

Figure 1 is an elevation of the device;

Fig. 2 is a similar elevation with the cover removed;

Fig. 3 is an enlarged bottom view;

Fig. 4 is a section on the line 4—4 of Fig. 2;

Fig. 5 is a section on the line 5—5 of Fig. 1; and

Fig. 6 is a circuit diagram.

The body of the structure or casing is made, preferably, from a single circular sheet of metal 1, drawn to cup-shaped form with side flanges 2. In the receptacle thus formed a partition 3 is located, said partition being preferably spot welded at its ends to the side walls 2. A series of supporting lugs 4 are formed in said side walls, by cutting the metal to form a tongue and bending said tongues inwardly, as shown in Figs. 2 and 4. Similar tongues are formed on the partition 3. A sheet metal post 5 is spot-welded to the rear wall of the casing. A cover 6 completes the inclosure, being a snug fit and held in place by screws 7 or other suitable fastening means. The inside of the chambers may be painted with luminous paint, if desired. The glass panels 8 and 9 are clamped between said cover and the supporting lugs 4. The glass panel 9 is also supported and positioned by the post 5. One of said panels covers the upper chamber in Fig. 2, and the other covers the upper part of the lower chamber.

The cover has three openings therein, as shown in Fig. 1, exposing to view glass panels 8 and 9, and also a lens 10. Said lens has a flange beneath said cover resting on the post 5 and the two lower lugs 4.

Incandescent lamps 11 and 12 are mounted in the back wall of the structure. The lamp in the upper compartment is, preferably, a 21 candle power lamp, and the lamp in the lower compartment a 2 candle power lamp. The lamps are mounted by striking up a collar 13 in the rear wall of the structure, through which the lamp base 14 passes and is soldered thereto. At one end of the base an attachment plug 15 may be inserted. Conductors 16 lead from said plug to the battery. The lamp structure is supported on a suitable bracket 17, which may be riveted to the rear wall thereof and bent around, as shown in Fig. 5, to receive a transverse bar 18, to which it is secured in any suitable manner, such as by spot welding, for example. This transverse bar supports the license plate 19 in position beneath the lamp structure. In order to illuminate said license plate a transparent panel 20 is mounted in the bottom of the lamp housing and is made, preferably, of glass.

The circuit diagram in Fig. 6 illustrates one manner of controlling the lamp circuits. The three transparent panels 8, 9, and 10 are shown diagrammatically in this figure, with incandescent lamps behind panels 8 and 10. These lamps are connected with the battery 21 and are in parallel with each other. The tail lamp has a switch 22 in series therewith, whereby it may be manually controlled, and the warning light has a switch 23 in series therewith operated by the brake pedal 24, or some other part which is moved when the car is slowed down or brought to a stop in a manner well understood in the art.

With the arrangement provided it will be seen that the tail light and the ornamental panel 9 are illuminated whenever the circuit of the switch 22 is closed, which would be in the night time or such other periods of time as would necessitate lighting of the tail light.

The glass panel comprising the name plate panel is, in the embodiment shown, a strip of plain, clear glass, with a decalcomania transfer on the inside surface, and thereafter covered with a coat of clear, hard, varnish or with another sheet of glass to prevent blistering from the heat of the incandescent lamp. The emblem or name may be in colors. These name plate panels are readily removable, so that the customer may be supplied with any particular emblem or name which he may wish to insert in place of the panel which is in the lamp when he buys it, and all of the name plate panels being the same size they are readily interchangeable.

One or both lights may be made to show from the front, if desired, simply by providing one or more openings in the back partition of each chamber and equipping said openings with suitable lenses. This is desirable in case the structure is mounted on the fender, as it enables the driver to determine whether the lights are operating properly, as diclosed more fully in my prior Patent 1,346,567, issued July 19, 1920. The device would also serve as a parking light in such case.

It is further evident that this signaling device may be used on street cars or other vehicles. Various other uses and modifications will readily suggest themselves to those skilled in the art; therefore, I do not wish to limit myself to the embodiment of the invention disclosed herein, except as necessitated by certain of the appended claims.

I claim:—

1. A vehicle signal lamp comprising a casing, a partition dividing said casing into two compartments, a lamp in one of said compartments coacting therewith to constitute a tail light, a lamp in the other compartment actuable to indicate change in velocity of a vehicle, said second lamp coacting with its compartment to constitute a stop light, a translucent lens and an indicia-bearing translucent panel over said tail light compartment, a translucent warning lens over said stop light compartment and a cover for said casing securing said lenses and panel in assembled relation to said casing.

2. A vehicle signal lamp comprising a casing, a partition dividing said casing into two compartments, a lamp in one of said compartments coacting therewith to constitute a tail light, a lamp in the other compartment actuable to indicate change in velocity of a vehicle, said second lamp coacting with its compartment to constitute a stop light, a translucent lens and a separately removable indicia-bearing translucent panel over said tail light compartment, a translucent warning lens over said stop light compartment and a removable cover for said casing. securing said lenses and panel in assembled relation to said casing.

3. A vehicle signal lamp comprising a casing, a partition dividing said casing into two compartments, a lamp in one of said compartments coacting therewith to constitute a tail light, a lamp in the other compartment actuable to indicate change in velocity of a vehicle, said second lamp coacting with its compartment to constitute a stop light, a translucent lens and an indicia-bearing translucent panel over said tail light compartment, a translucent warning lens over said stop light compartment, a cover for said casing securing said lenses and panel in assembled relation to said casing, and means to support and position said lenses and panel relative to said cover and casing.

4. A vehicle signal lamp comprising a casing, a cover therefor, a partition separating said compartment into two chambers, said cover being provided with two apertures overlying one of said compartments, a tail lamp in said latter compartment capable of constant illumination, a signal lens underlying one of said two apertures and an indicia-bearing translucent panel underlying the other of said apertures, said cover being provided with a third aperture overlying the other of said compartments, a lamp in said last named compartment capable of temporary illumination and a warning lens underlying said third aperture.

5. A vehicle signal lamp comprising a casing, a removable cover therefor, a partition separating said compartment into two chambers, said cover being provided with two apertures overlying one of said compartments, a tail lamp in said latter compartment capable of constant illumination, a signal lens underlying one of said two apertures and an indicia-bearing translucent panel underlying the other of said apertures, said cover being provided with a third aperture overlying the other of said compartments, a lamp in said last named compartment capable of temporary illumination and a warning lens underlying said third aperture, said lenses and panel being removable when said cover is removed from said casing and being positioned against removal by said cover when the latter is in assembled relation to said casing.

6. A vehicle signal lamp comprising a casing, a cover therefor, a partition separating said compartment into two chambers, said cover being provided with two apertures overlying one of said compartments, a tail lamp in said compartment capable of constant illumination, a signal lens underlying one of said two apertures and an indicia bearing removable translucent panel underlying the other of said apertures, said cover being provided with a third aperture overlying the other of the said compartments, a lamp in said last named compartment capable of temporary illumination and a warning lens underlying said third aperture.

7. A vehicle signal lamp comprising a casing and cover therefor, a partition separating said casing into two compartments, a lamp in each of said compartments, said cover being provided with an aperture overlying one of said compartments and two apertures overlying the other of said compartments, a warning lens underlying said first aperture, a signal lens and a translucent indicia bearing panel underlying said other apertures, said casing and partition being provided with angularly disposed supporting lugs.

In testimony whereof, I have subscribed my name.

PAUL A. STOVER.